(12) United States Patent
Katti et al.

(10) Patent No.: US 12,688,358 B2
(45) Date of Patent: Jul. 21, 2026

(54) SYSTEMS AND METHODS FOR DYNAMICALLY PROVIDING A CORRECT PRONUNCIATION FOR A USER NAME BASED ON USER LOCATION

(71) Applicant: RingCentral, Inc., Belmont, CA (US)

(72) Inventors: Vadiraj Katti, Pleasanton, CA (US); Ashish Seth, Los Altos, CA (US)

(73) Assignee: RingCentral, Inc., Belmont, CA (US)

( * ) Notice: Subject to any disclaimer, the term of this patent is extended or adjusted under 35 U.S.C. 154(b) by 155 days.

(21) Appl. No.: 18/397,748

(22) Filed: Dec. 27, 2023

(65) Prior Publication Data

US 2025/0217589 A1     Jul. 3, 2025

(51) Int. Cl.
 *G06F 40/268* (2020.01)
 *H04N 7/15* (2006.01)

(52) U.S. Cl.
 CPC ............. *G06F 40/268* (2020.01); *H04N 7/15* (2013.01)

(58) Field of Classification Search
 None
 See application file for complete search history.

(56) References Cited

U.S. PATENT DOCUMENTS

| | | | | |
|---|---|---|---|---|
| 9,747,891 | B1 * | 8/2017 | Abuelsaad | G10L 25/51 |
| 10,152,965 | B2 * | 12/2018 | Bruguier | G10L 15/26 |
| 10,244,105 | B2 * | 3/2019 | Prakash | H04M 3/42042 |
| 11,172,064 | B2 * | 11/2021 | Björsell | H04L 65/1046 |
| 12,020,683 | B2 * | 6/2024 | Bohra | G10L 13/04 |
| 12,081,599 | B1 * | 9/2024 | Paiuk | H04L 65/1089 |
| 2005/0272448 | A1 * | 12/2005 | Tran | H04M 1/575 |
| | | | | 455/566 |
| 2011/0250570 | A1 * | 10/2011 | Mack | H04M 3/42093 |
| | | | | 434/169 |
| 2015/0255069 | A1 * | 9/2015 | Adams | G10L 15/08 |
| | | | | 704/236 |
| 2016/0004748 | A1 * | 1/2016 | Botchen | H04L 67/04 |
| | | | | 709/204 |

(Continued)

FOREIGN PATENT DOCUMENTS

| | | | | |
|---|---|---|---|---|
| EP | 1143415 | B1 * | 4/2002 | ........... G10L 15/187 |
| WO | WO-2019050601 | A1 * | 3/2019 | ........... G10L 15/187 |

*Primary Examiner* — Pierre Louis Desir
*Assistant Examiner* — Sean Thomas Smith
(74) *Attorney, Agent, or Firm* — Ansari Katiraei LLP; Arman Katiraei; Sadiq Ansari

(57) ABSTRACT

A communication support system dynamically determines and presents to a conference participant the phonetic spelling for the proper pronunciation of a word associated with an individual engaging in a conversation with that conference participant prior to or during the establishment of the call, conference, or other communication session between the conference participant and the individual. The system receives an identifier that is associated with the identification or a device of that individual. The system retrieves the word associated with the individual based on a established correspondence between the identifier and the word, and maps the identifier to a region-of-origin. The system selects a set of entries that correspond different pronunciations of the word to different regions-of-origin, and presents, on a device of the conference participant, the proper pronunciation of the word from a particular entry of the set of entries that corresponds to region-of-origin.

19 Claims, 8 Drawing Sheets

(56)                    References Cited

U.S. PATENT DOCUMENTS

2021/0350784 A1*  11/2021  Selvaggi ............... G10L 13/047
2022/0417047 A1*  12/2022  Foufa .................... H04M 3/563
2024/0241904 A1*   7/2024  Su .......................... G06F 16/61

* cited by examiner

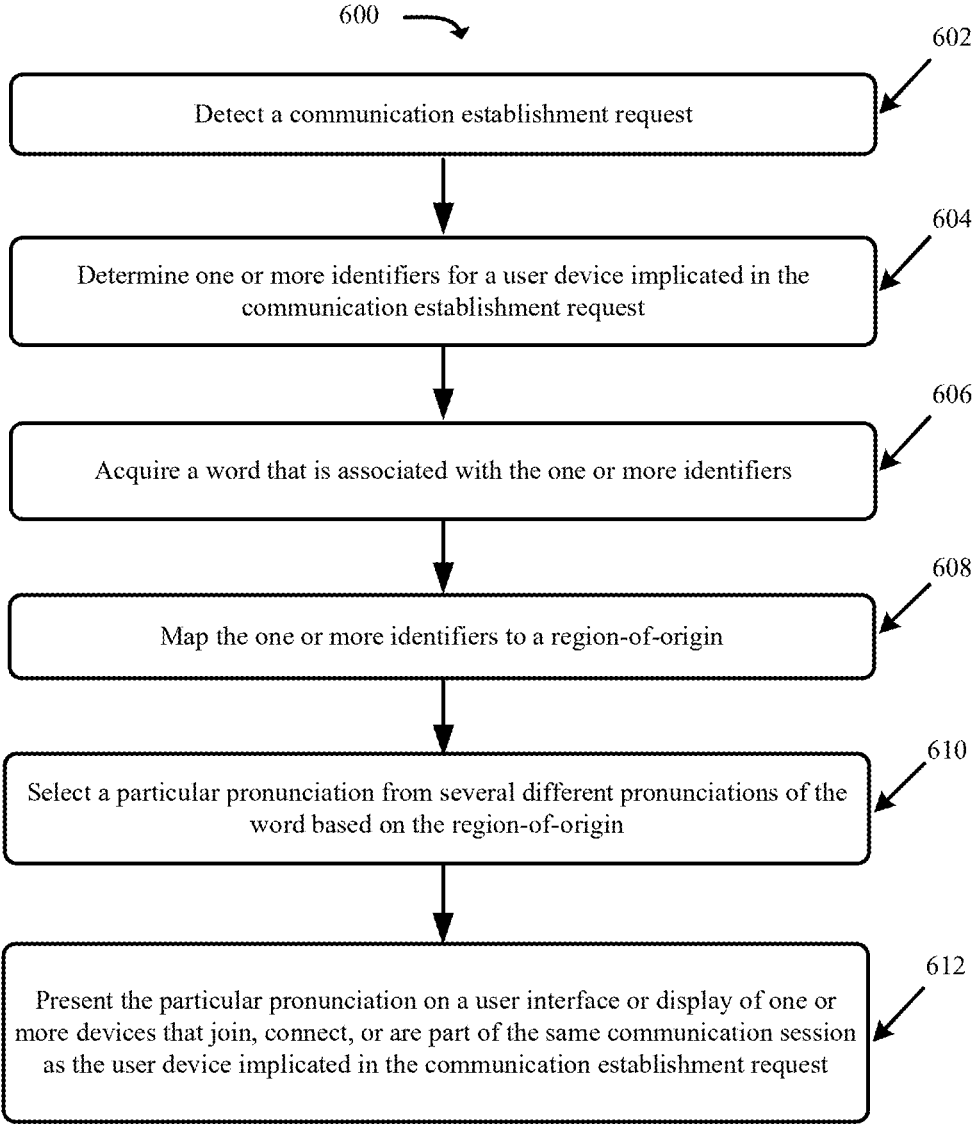

600

602
Detect a communication establishment request

604
Determine one or more identifiers for a user device implicated in the communication establishment request 606
Acquire a word that is associated with the one or more identifiers 608
Map the one or more identifiers to a region-of-origin 610
Select a particular pronunciation from several different pronunciations of the word based on the region-of-origin 612
Present the particular pronunciation on a user interface or display of one or more devices that join, connect, or are part of the same communication session as the user device implicated in the communication establishment request

FIG. 6

SYSTEMS AND METHODS FOR DYNAMICALLY PROVIDING A CORRECT PRONUNCIATION FOR A USER NAME BASED ON USER LOCATION

TECHNICAL FIELD

The present disclosure relates to the field of audio conferencing and telecommunications.

BACKGROUND

Incorrectly pronouncing the name of an individual while conversing with that individual is disrespectful and may adversely affect the individual's attitude or emotional state. Agents in contact centers, live support roles, and/or working with other colleagues may be confronted with names they do not know how to pronounce correctly or names that have different pronunciations based on the country of origin. For instance, the name "Jean" may be pronounced as "Gee-een" in one country or region and "Jon" in another country or region. Similarly, the name David may be pronounced as "Day-vid" in one country or region and "Dah-veed" in another country or region. The effectiveness or performance of an agent and the outcome of a conversation may be partly impacted by correctly and incorrectly pronouncing names of the conversation participants.

BRIEF DESCRIPTION OF THE DRAWINGS

FIG. 6 presents a process for providing the real-time support services including the region-adjusted word pronunciation in accordance with some embodiments presented herein.

DETAILED DESCRIPTION OF PREFERRED EMBODIMENTS

Figure 1:
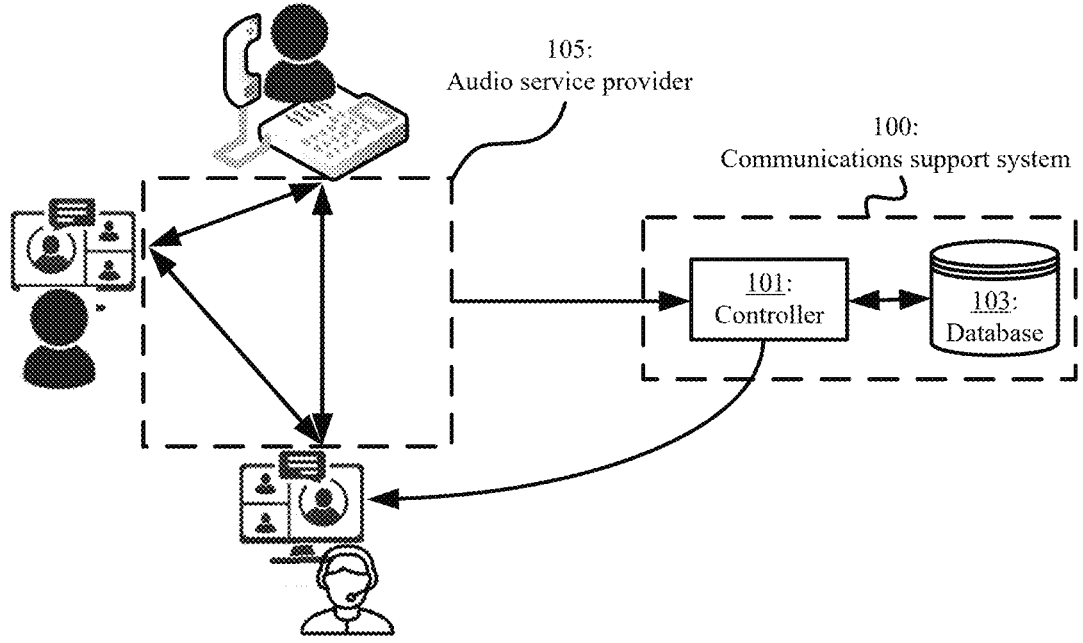
FIG. 1 illustrates an example environment for a communications support system that provides correct word pronunciations in real-time, monitors agent performance, and/or generates audio with correct word pronunciations in accordance with some embodiments presented herein.

This disclosure arises from the realization that individuals engaging in conversations with customers, clients, colleagues, and other users may incorrectly pronounce the name of, identifier for, or a word associated with the other party because they have never spoken with that other party, spoken with anyone having that name or identifier, or because the name, identifier, or word has different pronunciations in different countries or regions. The incorrect pronunciation may reduce the effectiveness of the speaker or adversely affect the outcome of the conversation as the other party may become irritated, angered, or otherwise placed in a negative frame-of-mind because of the perceived disrespect associated with the incorrectly pronounced name, identifier, or word.

The current disclosure provides a technological solution for a technological problem in the fields of audio conferencing and telecommunications. The technological solution introduces real-time systems and methods that detect the originating country or region associated with a conference participant, the written name of the conference participant, an identifier used by the conference participant, or a word associated with the conference participant, and the correct pronunciation for that written name, identifier, or word in the originating country or region. The technological solution includes presenting the phonetic spelling for the proper pronunciation of the name, identifier, word in a user interface of an individual engaging in a conversation with the conference participant prior to or during the establishment of the call, conference, or other audio service connecting the conference participant to the individual. Based on the presented phonetic spelling, the individual may address the conference participant with the correct pronunciation of the name, identifier, or word even if the name, identifier, or word is one the agent is unfamiliar with or has different pronunciations in different countries or regions. The technological solution improves telecommunications by providing real-time support to agents via the dynamically generated content (e.g., the phonetic spelling of the name, identifier, or word for the determined originating country or region) that assist the agents in correctly and respectfully addressing a diverse set of users anywhere in the world, thereby improving the effectiveness of the agents and improving the likelihood that the conversations or conferences end with a positive outcome.

The technological solution further involves monitoring and quantifying the agent effectiveness across a variety of factors including the correct pronunciation of a name, identifier, or word. For instance, the technological solution receives the agent audio stream, parses and/or analyzes the agent audio stream to detect mentions of the conference participant name, compares the audio sample of the mentioned conference participant name against the determined correct pronunciation, and scores the agent effectiveness in part based on the comparison. Managers may then be alerted as to the agent performance based on the scores without having to manually listen to every agent conversation.

The technological solution may also be used to improve machine-generated audio content. For instance, the correct pronunciation of a name, identifier, or word may be included in custom generated greetings or audio that is generated by chatbots, digital assistants, and/or other conversational systems. The technological solution improves the machine-generated speech or audio by modifying the pronunciation of a name, identifier, or word based on the region or country of the human being addressed by the machine-generated audio content. For example, the technological solution may customize the machine-generated voicemail greeting for users named Laura that are located in different regions. Specifically, the technological solution may generate a first voicemail greeting with audio that states "You have reached the voicemail box of Lao-rah, please leave a message" when the user name is Laura and the telephone number of the user is associated with a country code that maps to England, and may generate a second voicemail greeting with audio that states "You have reached the voicemail box of Lah-rah, please leave a message" when the user name is Laura and the telephone number of the user is associated with a country code that maps to Germany.

FIG. 1 illustrates an example environment for communications support system 100 that provides correct word pronunciations in real-time, monitors agent performance, and/or generates audio with correct word pronunciations in accordance with some embodiments presented herein. The term "word" is used in the provided examples, figures, embodiments, and disclosures to interchangeably refer to names, nicknames, places, identifiers, and/or other terms that may have geolocation specific pronunciations or different pronunciations when spoken in different regions. Communications support system 100 includes controller 101 and database 103 that are integrated as part of various audio services provided by audio service provider 105.

In some example embodiments, audio service provider 105 may include call center or customer support systems that connect live agents to customers, clients, or other users. Audio service provider 105 may provide telephony services (e.g., Plain Old Telephone Services (POTS)) or network-based communications (e.g., Internet or network-based audio and/or video conferencing). Accordingly, audio service provider 105 may support voice-only communications or voice and video communications (e.g., video conferencing solutions) involving two or more participants. In some example embodiments, audio service provider 105 may include devices or systems that generate audio for customized messages, or may include chatbots, digital assistants, and/or other devices or systems that simulate a human by interacting with actual human users using machine-generated audio.

Controller 101 may include one or more devices with processing, memory, storage, network, and/or other hardware resources. Controller 101 may integrate with a dialer or conferencing application of audio service provider 105 in order to receive telephone numbers, network addresses, unique device signatures, geolocation data, and/or other identifiers for the users or conference participants. For instance, controller 101 receives the telephone number for each outbound call that is placed by a dialer of a call center, the telephone number of each inbound call coming into the call center and/or that is routed to a dialer in the call center, and/or the Internet Protocol (IP) address and other identifiers of each device connecting to an audio and/or video conference via a conferencing application that is connected to the conference. Controller 101 may receive these and other identifiers as a call or conference is being established. The dialers and conferencing applications may be used by the agents in a call center or may be distributed to all users accessing services from audio service provider 105.

Controller 101 may also integrate with a Customer Relationship Management (CRM) or other data repository of audio service provider 105. The CRM or data repository may store words that are associated with the received identifiers (e.g., telephone numbers, network addresses, unique device signatures, etc.) and/or that identify the users associated with the received identifiers. Controller 101 may query the CRM or data repository using a received telephone number, network address, unique device signature, or other identifier in order to obtain the word for identifying the user (e.g., name, nickname, etc.) associated with that identifier.

Controller 101 determines a country or region that is associated with the conference participant or user identified by the identifier (e.g., telephone number, network address, unique device signature, etc.) using values that are extracted from or that map to the identifier. For instance, the telephone number country code, area code, network address, and/or unique device signature may directly or indirectly map to a country or region.

Controller 101 provides the determined country or region and the user identifying word to database 103. Database 103 returns a phonetic spelling of the word for the correct or predominant pronunciation of the word in the determined country or region. In some embodiments, the controller 101 may provide additional words that are associated with the user name, where the additional words may include nicknames, towns, cities, and any other word that may have a geolocation-specific pronunciation. For example, the user may be calling from Iceland, specifically Reykjavik. Database 103 may return a phonetic spelling of the user name as well as a phonetic spelling of "Reykjavik".

Figure 2:
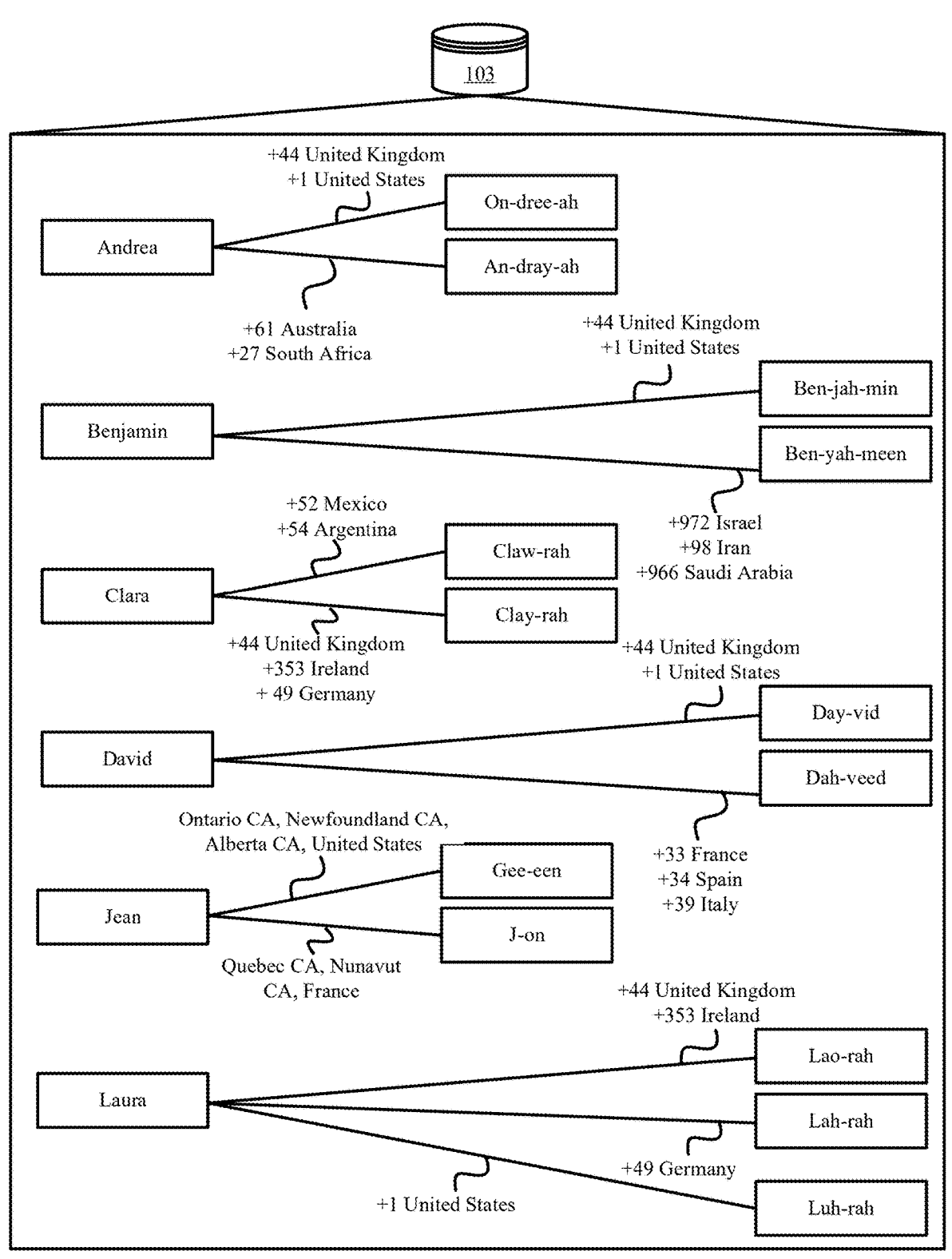
FIG. 2 illustrates an example list of entries that correspond different word pronunciations to different countries or regions.

Database 103 stores a list of words, one or more pronunciations associated with each word, and a link, correspondence, or association between each pronunciation and one or more countries or regions where those pronunciations are commonly used. FIG. 2 illustrates an example list of entries within database 103 that correspond different word pronunciations to different countries or regions.

As shown in FIG. 2, a single pronunciation may be associated with multiple countries or regions, and different pronunciations may be associated with different regions of the same country. For instance, French speaking regions of Canada or Cantonese speaking regions of China may speak a particular word with a first pronunciation, and English speaking regions of Canada or Mandarin speaking regions of China may speak the particular word with a second pronunciation. Accordingly, the different pronunciations may correspond to a word entry in database 103 based on country codes, country names, provincial names, regional identifiers, ethnic classifiers, and/or other regional descriptors. For the purposes of providing a clear example, FIG. 2 illustrates pronunciations of different names. In other examples, not pictured, database 103 may store phonetic spellings and/or audio samples of other words that may have geolocation-specific pronunciations.

In some example embodiments, database 103 may store audio samples for each of the different pronunciations in addition to the phonetic spelling for the different pronunciations. In some other example embodiments, controller 101 includes a text-to-speech convertor that generates audio with different word pronunciations based on the different phonetic spellings of that word stored in database 103.

Controller 101 presents the phonetic spelling for a determined pronunciation of a word on a user interface or display of a device that is used to establish a communication session with another user or device. For instance, the device may include a dialer or conferencing software on a computer, laptop, smartphone, or other communication device. The user interface or display on an agent device may present data that is stored in the CRM (e.g., name, purchase history, call history, etc.) for one or more users being contacted by that agent device. Controller 101 may update or modify the user interface on the agent device to present the phonetic spelling for the correct pronunciation of a user name as the user device attempts to establish a communication session with that user.

Figure 3:
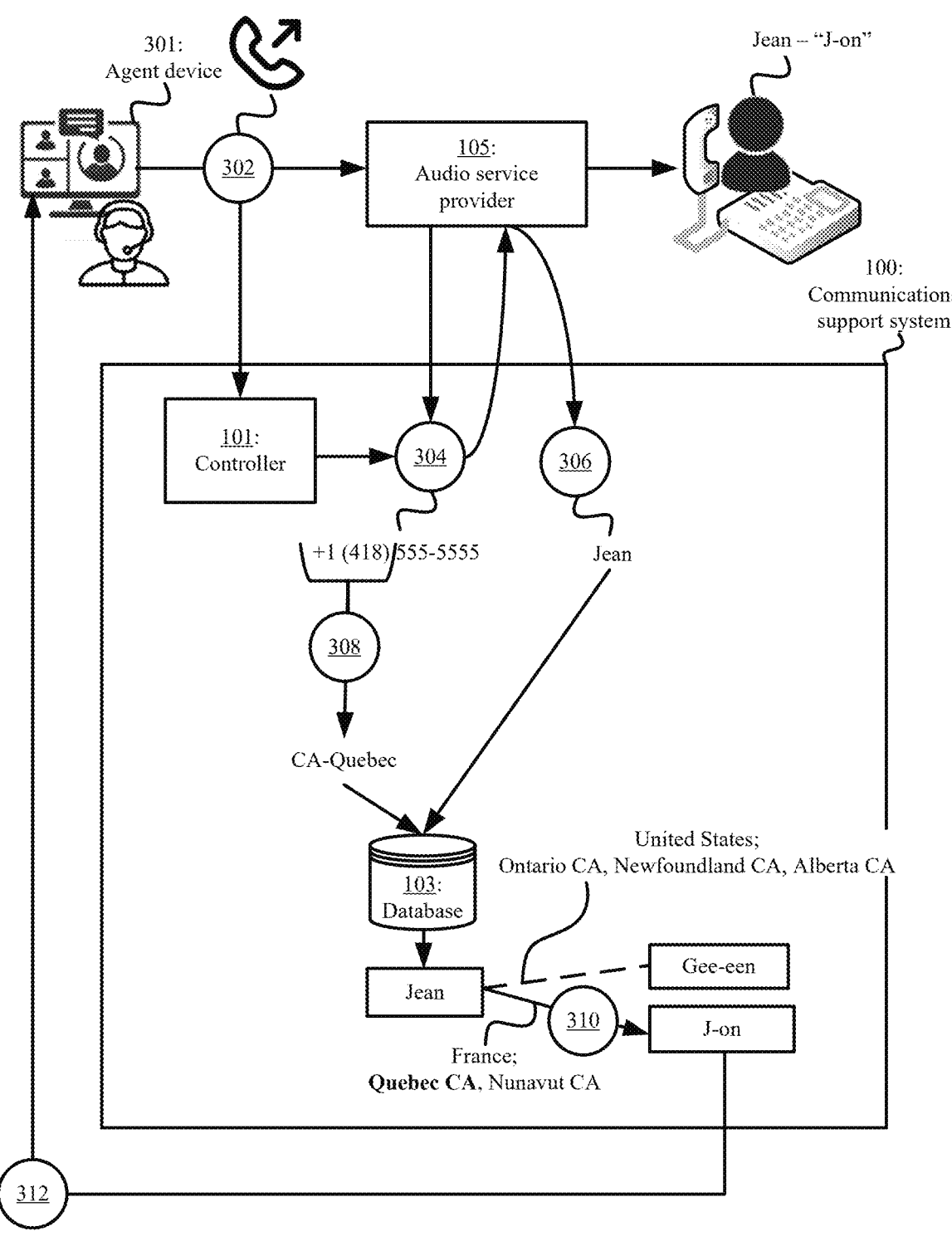
FIG. 3 illustrates an example of providing real-time conferencing support with the correct pronunciation of a user identifying word prior to or during the establishment of a communication session with the identified user in accordance with some embodiments presented herein.

FIG. 3 illustrates an example of providing real-time conferencing support with the correct pronunciation of a user identifying word prior to or during the establishment of a communication session with the identified user in accordance with some embodiments presented herein. Communications support system 100 detects (at 302) an outbound call being placed from an agent device 301. For instance, agent device 301 issues a request to a dialer to initiate a communication session with a first user and/or first user device that is associated with a first telephone number. In some example embodiments, controller 101 of communications support system 100 may be integrated as part of the dialer and may intercept the request as it is passed to or from the dialer. In some example embodiments, agent device 301 forwards the request to controller 101. In some example embodiments, agent device 301 places the outbound call request through audio service provider 105 and audio service provider 105 forwards the request to communications support system 100 while connecting the call with the intended recipient.

Communications support system 100 receives (at 304) the first telephone number in response to detecting (at 302) the outbound call. The first telephone number may be included in the request issued by agent device 301 or in the signaling or messaging issued by audio service provider 105 to establish the communication session.

Communications support system 100 retrieves (at 306) the word for identifying the first user that is associated with the first telephone number in the CRM or data repository of audio service provider 105. For instance, controller 101 may perform a lookup of the first telephone number in the CRM in order to retrieve the spelling of the first user name that is associated with the first telephone number. Since agent device 301 is placing an outbound call to the first telephone number, agent device 301 may prefetch the first user name and other stored information about the first user to present on a user interface for the calling agent, and the first user name may therefore be retrieved (at 306) from agent device 301 or included as part of the intercepted request.

Communications support system 100 determines (at 308) a first region-of-origin based on a country code and/or area code of the first telephone number. For instance, the country code identifies a specific country with a population that is spread across different ethnic groups, that speak different languages, or that has other cultural or linguistic differences. The area code may map to a specific region in the specific country that is predominated by a particular ethnic group speaking a particular language. Accordingly, one or more of the country code and the area code may be used to define the regions-of-origin according to different geographic boundaries, ethnic groups, and/or cultural or linguistic differences differentiated in the regions spanned by the country codes and area codes. Since the first region-of-origin is tied to the first telephone number which is tied to a particular country or region where the first telephone number was activated or registered, the first region-of-origin remains constant even when the user device moves between different countries or regions. For instance, a telephone number with the country code of 61 indicates that the telephone number was issued or registered to a user device in Australia even if the user device is currently located and used in another country, a telephone number with the country code of 55 indicates that the telephone number was issued or registered to a user device in Brazil even if the user device is currently located and used in another country, and a telephone number with the country code of 1 indicates that the telephone number was issued or registered to a user device in Canada or the United States even if the user device is currently located and used in another country.

Communications support system 100 obtains (at 310) a phonetic spelling that specifies a first pronunciation for the first user identifying word in the first region-of-origin. Controller 101 may query database 103 using the determined (at 308) first region-of-origin and the first user identifying word. Database 103 searches for a first set of entries that store one or more phonetic spellings for one or more pronunciations of the first user identifying word, and selects a particular entry from the first set of entries that corresponds to the first region-of-origin and that stores the first pronunciation for the first user identifying word in the first region-of-origin. For instance, communications support system 100 matches the first user identifying word of Jean to a database entry containing the phonetic spelling of "J-on" for the first user identifying word in the first region-of-origin associated with the first telephone number.

Communications support system 100 presents (at 312) the phonetic spelling for the first pronunciation of the first user identifying word in the first region-of-origin on a display or user interface of agent device 301. In some example embodiments, the phonetic spelling is presented (at 312) to agent device 301 in real-time as the communication session is being established so that once the communication session is established, the agent sees the phonetic spelling of the first user identifying word and correctly addresses the first user with the correct pronunciation of the first user identifying word when conversing with the first user.

In some examples embodiments, communications support system 100 provides agent device 301 with an audio sample for the first pronunciation of the first user identifying word. In some such example embodiments, the audio sample is stored with the phonetic spelling in database 103 or is generated dynamically by controller 101 based on the phonetic spelling. Agent device 301 may playback the audio sample prior to the communication session being established. In yet other example embodiments, communications support system 100 provides agent device 301 with the phonetic spellings and/or audio samples of additional words that may be associated with the user, the reason for the conversation, topics to be discussed during the conversation, and/or other terms that may be have regional or geographic specific pronunciations. For instance, communications support system 100 may provide agent device 301 with the correct regional pronunciation for a city, state, food, product, service, street name, or phrase in the region identified for the first user.

Figure 4:
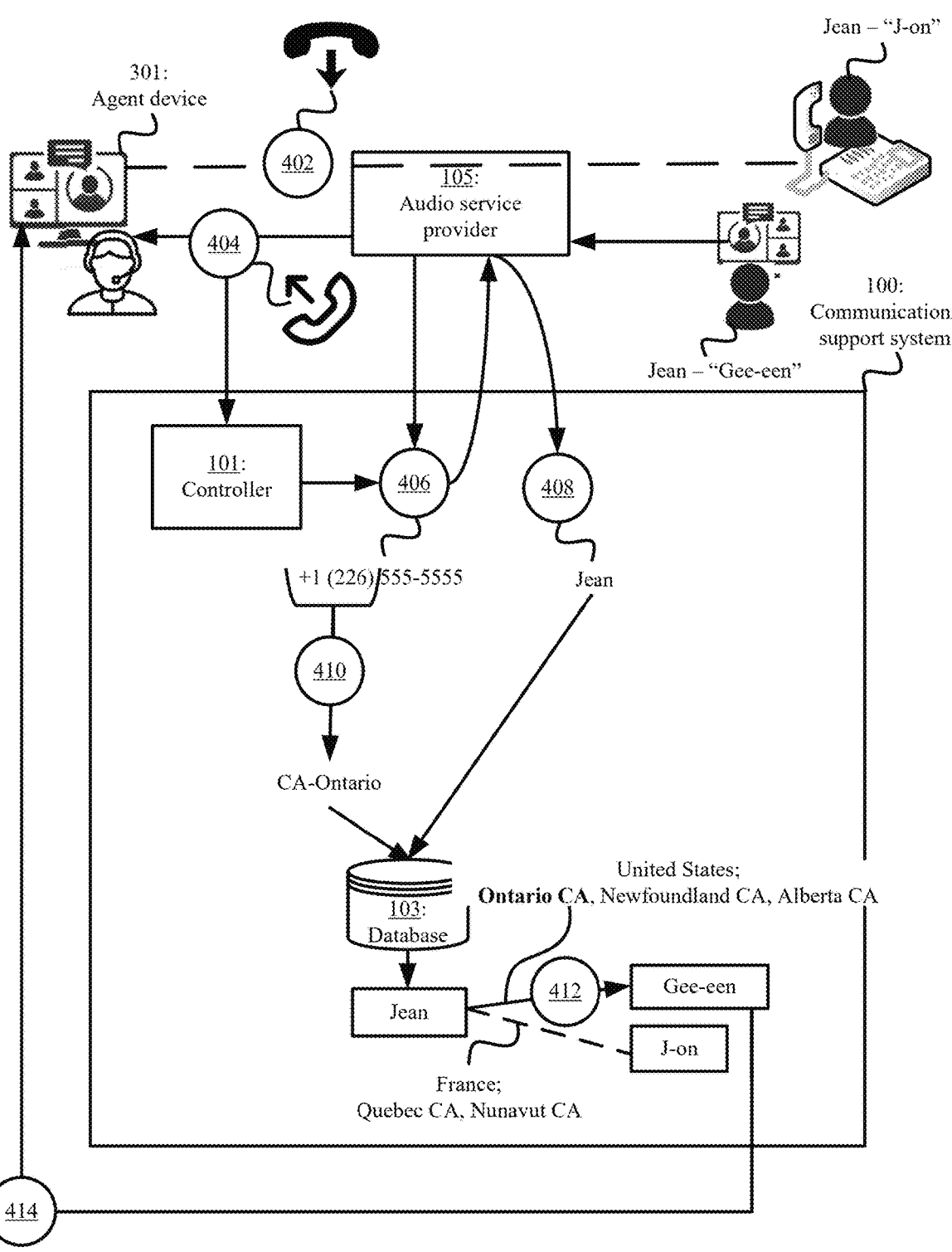
FIG. 4 illustrates an example of the communications support system providing a different pronunciation of the same word to an agent device based on a second communication session that is associated with a different region-of-origin in accordance with some embodiments presented herein.

FIG. 4 illustrates an example of communications support system 100 providing a different pronunciation of the same word to agent device 301 based on a second communication session that is associated with a different region-of-origin in accordance with some embodiments presented herein. For instance, agent device 301 concludes (at 402) the outbound call with the first user device that is associated with the name Jean in the first region-of-origin, and communications support system 100 detects (at 404) an inbound call for agent device 301 that is originated by a second user device associated with a second telephone number.

Communications support system 100 receives (at 406) a second telephone number that is associated with the inbound caller. A caller identification (callerID) function or service may provide the second telephone number during the inbound call establishment procedure.

Communications support system 100 retrieves (at 408) the name of a second user that is associated with the second telephone number and/or the second user device in the CRM or data repository of audio service provider 105. The name of the second user is Jean and is spelled the same as the name of the first user that agent device 301 concluded (at 402) a call with.

Communications support system 100 determines (at 410) a second region-of-origin for the second user, that is different than the first region-of-origin determined for the first user, based on a different country code or area code that is associated with the second telephone number than with the first telephone number of the first user. As shown in FIGS. 3 and 4, the first and second telephone numbers have the same country code of +1 that identifies a telephone number originating in either Canada or the United States. However, the area code of the first telephone number is associated with a predominantly French speaking province or region of Canada, whereas the area code of the second telephone number is associated with a predominantly English speaking province or region of Canada.

Communications support system 100 obtains (at 412) a phonetic spelling for a second pronunciation of the name Jean in the second region-of-origin that is different than the first pronunciation for the name Jean in the first region-of-origin. Specifically, since the first user name and the second user name are the same, database 103 selects the same set of entries that are created for the name Jean. However, the second region-of-origin corresponds to a second entry from the set of entries that stores the second pronunciation for the name. For instance, the second entry provided in response to the second region-of-origin for the name Jean may contain the phonetic spelling of "Gee-een" that is different than the phonetic spelling of "J-on" provided in response to the first region-of-origin for the name Jean.

Communications support system 100 presents (at 414) the phonetic spelling for the second pronunciation of the second user name in the second region-of-origin on the display or user interface of agent device 301 prior to connecting the inbound call or during the establishment of the inbound call. In this manner, communications support system 100 notifies agent device 301 of the different pronunciations of Jean when communicating with users from the first region-of-origin (e.g., French speaking province or region of Canada) and users from the second region-of-origin (e.g., English speaking province or region of Canada).

Communications support system 100 may provide the same real-time support functionality for conferencing sessions or communication sessions taking place over a data network using various networking protocols (e.g., Voice-over-IP, Transmission Control Protocol, Real-Time Transport Protocol, Session Initiation Protocol, H.323 protocol stack, HyperText Transfer Protocol (HTTP) Live Streaming, Dynamic Adaptive Streaming over HTTP, Web Real-Time Communications, etc.). In such instances, a telephone number may be unavailable for use in determining the region-of-origin. Accordingly, communications support system 100 supports alternative identifiers (e.g., network address, device signatures, geolocation information, etc.) for determining the region-of-origin of different users participating in the conferencing sessions or communication sessions.

Figure 5:
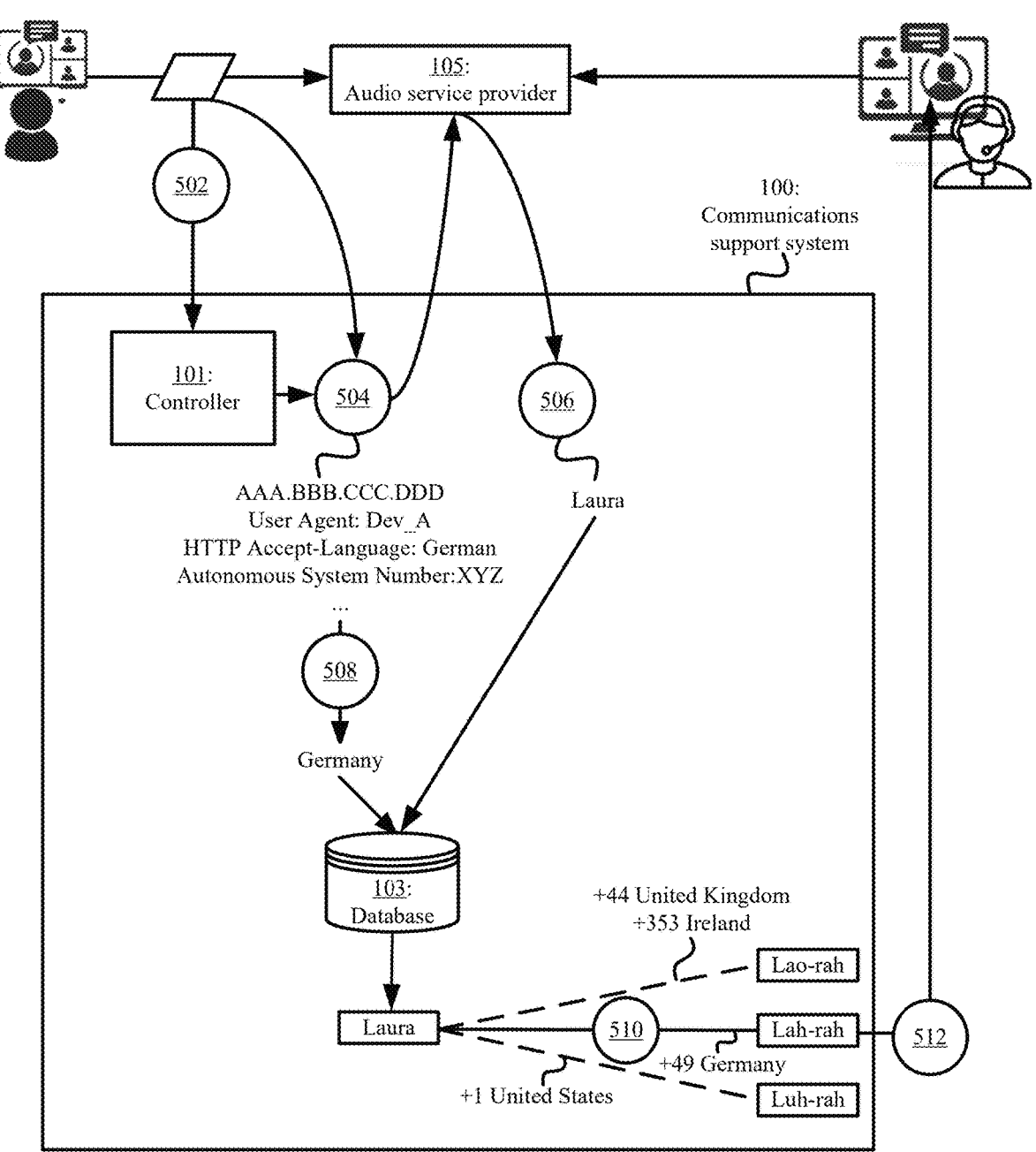
FIG. 5 illustrates an example of providing real-time conferencing support via region-adjusted word pronunciations for conferences occurring over a data network in accordance with some embodiments presented herein.

FIG. 5 illustrates an example of providing real-time conferencing support via region-adjusted word pronunciations for conferences occurring over a data network in accordance with some embodiments presented herein. In this example, audio service provider 105 hosts audio and/or video conferences for user devices that may connect without a telephone number or that may not be associated with a telephone number.

Communications support system 100 detects (at 502) a first user device connecting to the conference via a particular Uniform Resource Locator (URL), Uniform Resource Identifier (URI), or other link. For instance, the first user device issues one or more data packets to a destination network address associated with the conference or with audio service provider 105. The one or more data packets may include a request to join the conference and/or identifying information for the first user device and/or the user associated with the first user device. Communications support system 100 may receive a copy of the one or more data packets from audio service provider 105 as a result of integrating controller 101 into the conferencing service.

Communications support system 100 obtains (at 504) identifying information for the first user device or the first user from the one or more data packets. The identifying information may include the IP address or other network address of the first user device that is stored in the headers of the one or more data packets. The identifying information may also contain a unique device signature that differentiates the first user device from other user devices. For instance, the device signature may be defined from a combination of the network address, user agent, software version numbers, language settings, cipher parameters, request formats, access tokens, access credentials specified in the one or more data packets, and/or other data in the one or more data packets that collectively differentiate the first user device from other user devices.

Communications support system 100 retrieves (at 506) a word (e.g., the user name) that is associated with one or more of the obtained (at 504) identifying information. In some example embodiments, communications support system 100 queries the CRM or data repository of audio service provider 105 with the obtained (at 504) identifying information for any associations, correspondence, or links between the identifying information and the word. For instance, the IP address or device signature may be associated with a user profile or account that stores the word used to identify the user. In some other example embodiments, the word is contained within the one or more data packets. For instance, when a user joins a video conference, the user provides or logs in with the identifying word that is displayed next to the video stream of that user. In still some other example embodiments, the first user device may provide login credentials when joining the conference. The login credentials may access the user profile or account that stores the word, and communications support system 100 may access the user profile or account in order to retrieve (at 506) the word while the first user device is being authenticated or authorized to join the conference.

Communications support system 100 determines (at 508) a region-of-origin for the connecting user (e.g., the first user associated with the first user device) based on the identifying information. For instance, communications support system 100 may map the network address of the first user device to a particular region-of-origin, or may use geolocation information included with the identifying information to determine (at 508) the region-of-origin. Communications support system 100 may leverage routing information that is appended to the data packets to assist in the region-of-origin determination. For instance, communications support system 100 may identify the first Autonomous System Number (ASN) that a first network router attaches to a data packet sent from the first user device, and may map the first ASN to the region-of-origin. In some example embodiments in which the first user device is a mobile device that accesses the data network through a Fifth Generation (5G) core network or other telecommunications core network, communications support system 100 may query one or more components of the core network to map the network address (e.g., IP address) that was assigned to the mobile device to the telephone number that is registered to the mobile device. For instance, communications support system 100 may issue a request to one or more of the Session Management Function (SMF), Unified Data Management (UDM), Unified Data Repository (UDR), User Plane Function, or other component or function of the core network to map the network address used by the first user device to the telephone number registered to the first user device. Communications support system 100 may then determine (at 508) the region-of-origin from the country code or area code of the returned telephone number.

Communications support system 100 determines (at 510) a phonetic spelling for a common pronunciation of the word in the determined (at 508) region-of-origin. Database 103 stores different pronunciations of the word with an association of each pronunciation to one or more regions-of-origin. Communications support system 100 queries database 103 using the spelling of the word and the determined (at 508) region-of-origin in order to obtain the correct pronunciation for that word in the determined (at 508) region-of-origin.

Communications support system 100 presents (at 512) the phonetic spelling for the common pronunciation of the word in the determined (at 508) region-of-origin on displays or user interfaces of other conference participants or on a display or user interface of the user device initiating the conference or serving as the conference host. Accordingly, the conference participants may speak the word with the correct pronunciation of the user's region-of-origin without having previously spoken to the first user, having knowledge of the first user region-of-origin, or having previously heard the word with the correct pronunciation.

FIG. 6 presents a process 600 for providing the real-time support services including the region-adjusted word pronunciation in accordance with some embodiments presented herein. Process 600 is implemented by communications support system 100. Communications support system 100 implements process 600 for communication sessions established by audio service provider 105, wherein audio service provider 105 may provide telephony, conferencing, and/or communications solutions for individual users, call centers, customer support systems, companies, and/or other entities to connect and communicate with one or more users using audio.

Process 600 includes detecting (at 602) a communication establishment request. The communication establishment request may correspond to a request for establishing an outbound telephone call, connecting an inbound call, remotely joining a conference, and/or otherwise connecting one user device with another device or conference with other connected user devices for voice communications. Communications support system 100 may detect (at 602) the communication establishment request by monitoring for specific telephony signaling and conferencing messaging that route through audio service provider 105.

Process 600 includes determining (at 604) one or more identifiers for a user device implicated in the communication establishment request. The one or more identifiers may include a telephone number with area code and country code, a network address, a unique device signature, geolocation data, and/or other data that uniquely identifies or differentiates the user device from other user devices. Communications support system 100 may prioritize or order the one or more identifiers based on accuracy for determining the region-of-origin. For instance, a telephone number may have precedence over a network address and the network address may have precedence over geolocation data in determining the region-of-origin. Accordingly, if the telephone number is unavailable or cannot be obtained, communications support system 100 may acquire and use the network address for the region-of-origin determination.

Communications support system 100 may determine (at 604) the one or more identifiers directly from the communication establishment request and/or the associated telephony signaling or conferencing messaging. For instance, callerID messages may contain the user device telephone number and data packets for joining a conference may contain the user device network address. In some example embodiments, communications support system 100 determines (at 604) the one or more identifiers indirectly from the communication establishment request. For instance, the communication establishment request may contain a network address and no telephone number. Communications support system 100 may look up a telephone number that is registered to the user device assigned the network address by a telecommunications core network. Alternatively, the communication establishment request may contain login credentials for authorizing the user device access to a conference or communication session. The login credentials may access a user account, and communications support system 100 may retrieve data in the user account including a telephone number that is associated with the user device and/or account.

Process 600 includes acquiring (at 606) a word that is associated with the one or more identifiers. In some example embodiments, the word is included with the communication establishment request. For instance, the user device may provide a name in the data packets used to join a conference, and the name may be displayed to other conference participant by the conferencing software or application. Alternatively, the word may be stored in a user account that is accessed by login credentials provided with the communication establishment request. In some other example embodiments, communications support system 100 matches the one or more identifiers to the word. For instance, communications support system 100 queries a CRM or other data repository of audio service provider 105 that provides the telephony, conferencing, and/or other communication services for the user devices. The query may include the one or more identifiers, and the CRM or other data repository may return a word with an established correspondence to the one or more identifiers based on the word being stored or linked to the one or more identifiers. The word may be defined as a string of text or alphanumeric characters.

Process 600 includes mapping (at 608) the one or more identifiers to a region-of-origin. The region-of-origin may correspond to a country, province, ethnic region spanning part of a country or one or more countries, region predominated by a specific language (e.g., Mandarin or Cantonese) and/or other regional partitions.

The telephone number country code may directly map (at 608) to the region-of-origin. For instance, the country code identifies the country in which the telephone number was originated or registered. Similarly, the telephone number area code may map to a specific province, ethnic region, or region where a specific language is predominantly spoken. For instance, Canadian area codes may map to regions where English is the predominant language or regions where French is the predominant language.

The network address or geolocation data may also be mapped to a region-of-origin. However, since the network address or geolocation data may change based on the current location of the user device rather than be fixed to a specific region-of-origin, communications support system 100 may perform the mapping (at 608) based on a prioritized ordering of the one or more identifiers. For instance, the mapping (at 608) is performed if the telephone number is available. If the telephone number is not available, the mapping (at 608) is performed based on the network address and/or geolocation data.

Process 600 includes selecting (at 610) a particular pronunciation from several different pronunciations of the word based on the region-of-origin. The particular pronunciation may provide a phonetic spelling that is different than the actual spelling of the word and that textually defines a specific pronunciation of the word. An audio sample with recorded audio for the particular pronunciation may also be associated with the phonetic spelling of the word. In some example embodiments, the audio for the particular pronunciation is dynamically generated by controller 101 based on the phonetic spelling. Specifically, controller 101 may include a text-to-speech converter that speaks the word with the particular pronunciation by processing the phonetic spelling.

Communications support system 100 generates or obtains a model or mapping between different pronunciations of a word and regions-of-origin where those pronunciations are used. For instance, the model may be generated by analyzing audio between users in different regions-of-origin, determining the phonetic spelling or pronunciation of the user names and other words from audio samples where the names and other words are spoken, and associating the phonetic spelling or pronunciation to the region-of-origin. The model or mapping is stored in database 103. Accordingly, selecting (at 610) the particular pronunciation includes querying database 103 with the word and the region-of-origin determined from the request identifiers. The word is used to select a set of entries or records in database 103 that contain different pronunciations of the word, and the region-of-origin is used to select a particular entry or record from the set of entries or records that contains the particular pronunciation of the word in the identified region-of-origin.

Process 600 includes presenting (at 612) the particular pronunciation on a user interface or display of one or more devices that join, connect, or are part of the same communication session as the user device implicated in the communication establishment request. Presenting (at 612) the particular pronunciation may include displaying the phonetic spelling for the particular pronunciation on the user interface or display while the communication session is being established or at the start of the communication session (e.g., the telephone call has been connected or the user device has joined the conference). Presenting (at 612) the particular pronunciation may also include playing an audio sample with the particular pronunciation of the word on the one or more devices in a manner that cannot be heard on the user device implicated in the communication establishment request.

The one or more devices receiving the particular pronunciation may include agent devices in a call or support center that use audio service provider 105 to contact users. Communications support system 100 integrates with audio service provider 105 to provide the real-time pronunciation support for communication sessions being established by the agent devices. The one or more devices may also include any device that connects to or joins a conference. For instance, a conference provider may incorporate the real-time pronunciation support provided by communications support system 100 into its conferencing solutions or software. The conference provider may provide communications support system 100 with information about every connected user or user device so that communications support system 100 may generate and present (at 612) the region-adjusted word pronunciation for every user of a conference to every other user of that conference.

Communications support system 100 may monitor the audio from the established communication session in order to detect whether the user provided with the particular pronunciation correctly speaks the word with the particular pronunciation. Communications support system 100 may measure the effectiveness or performance of that user in part based on the word pronunciation. For instance, communications support system 100 may provide agent monitoring and scoring services, and the correct pronunciation of a word may be one of several factors with which communications support system 100 scores the effectiveness or performance of an agent.

Figure 7:
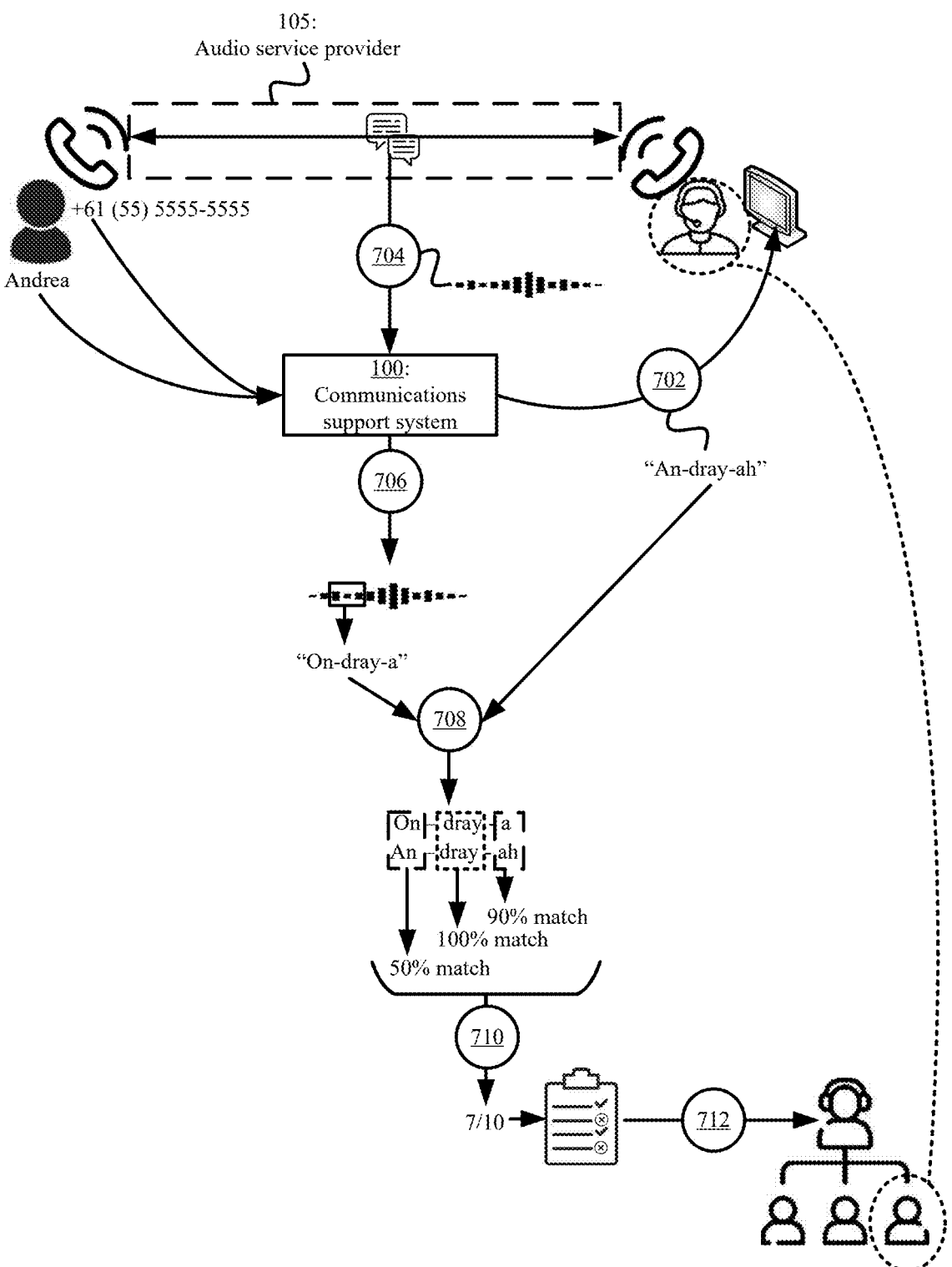
FIG. 7 illustrates an example of automated performance evaluation performed by the communications support system in accordance with some embodiments presented herein.

FIG. 7 illustrates an example of the automated performance evaluation performed by communications support system 100 in accordance with some embodiments presented herein. Communications support system 100 selects and presents (at 702) a particular pronunciation for a word on an agent device based on an region-of-origin that is determined for another user in a communication session with the agent using the agent device.

Communications support system 100 receives (at 704) the communication session audio stream. For instance, audio service provider 105 may forward a copy of the audio stream to communications support system 100 or communications support system 100 may connect to the communication session as a passive listening device.

Communications support system 100 analyzes (at 706) the audio stream for a mention or reference of the word by the agent. Specifically, communications support system 100 searches for sounds matching any pronunciation of the word.

Communications support system 100 compares (at 708) the pronunciation of the word in the audio stream to the particular pronunciation that was selected and presented (at 702) to the agent. Communications support system 100 may obtain or generate a reference audio sample for the particular pronunciation of the word to compare against the agent's speaking of the word.

The comparison (at 708) may include performing a syllable-by-syllable comparison of the audio to determine an amount by which the emphasis of the same syllables in the reference audio sample and the agent's speaking of the word differ, the amount by which the pitch of the same syllables differ, and/or an amount by which the sounds produced by the same syllables differ. In some example embodiments, the comparison (at 708) may include converting the agent's speaking of the word to a phonetic transcription, and comparing the phonetic transcription to the phonetic spelling of the particular pronunciation presented (at 702) to the agent.

Communications support system 100 generates (at 710) a score based on the comparison (at 708). A higher or positive score indicates that the agent's speaking of the word matches or is substantially similar to the particular pronunciation provided by communications support system 100, and a lower or negative score indicates that the agent's speaking of the word deviates significantly from the particular pronunciation provided by communications support system 100. The score may be included in a comprehensive evaluation of the agent's performance. For instance, communications support system 100 may monitor other aspects of the conversation and may generate other scores based the closeness with which the agent follows a script, speaks slowly, does not interrupt the other user, speaks with a positive tone, etc.

Communications support system 100 generates (at 712) an alert in response to the pronunciation score or the cumulative score for the agent performance falling below a threshold. The alert may be issued to a manager or supervisor via an email, text message, or other communication. The manager or supervisor may intervene and contact the agent while the communication session is ongoing to provide instruction or guidance to the agent, or may provide training to the agent once the communication session has concluded.

Communications support system 100 may also generate audio for the particular pronunciation of a word to include as part of audio messages or greetings that are customized for each region-of-origin, audio conversations conducted by chatbots, audio generated by digital personal assistants, and/or other machine-generated audio. For instance, communications support system 100 may supply Siri™, Cortana™, Alexa™, and/or other digital personal assistants with the correct pronunciation of a user's name and/or other words for a given region-of-origin so that the digital personal assistant may address the user with the correct pronunciation of their name and may correctly pronounce street name, city names, foods, products, services, and/or other terms with region-specific pronunciations.

Figure 8:
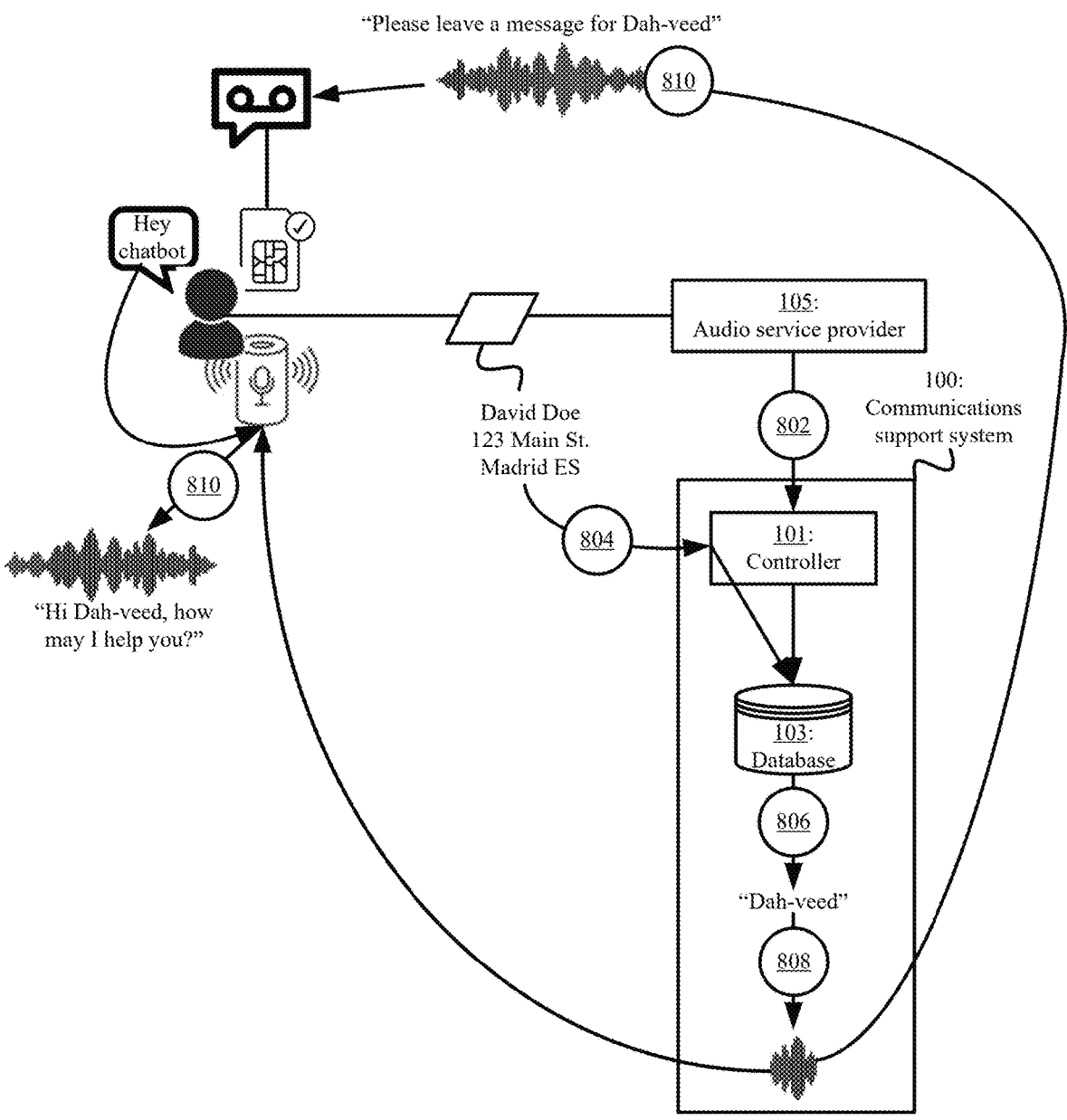
FIG. 8 illustrates an example of generating a customized audio message with a region-adjusted word pronunciation in accordance with some embodiments presented herein.

FIG. 8 illustrates an example of generating a customized audio message with a region-adjusted word pronunciation in accordance with some embodiments presented herein.

Communications support system 100 receives (at 802) notice of an activation or registration of a user device. For instance, a user registers for a new mobile device or activates a digital personal assistant device with audio service provider 105, and audio service provider 105 provides the notice of the activation or registration request to communications support system 100.

Communications support system 100 retrieves (at 804) the user name and a region-of-origin associated with the activation or registration. For instance, when signing up for new cellular service or when creating an account to activate a digital personal assistance device, the user provides their name, an address, and/or telephone number. Moreover, a telephone number with a country code may be assigned or associated with the device when registering new cellular service. Communications support system 100 may determine the region-of-origin from the address or telephone number.

Communications support system 100 maps (at 806) the user name and the region-of-origin to a particular pronunciation or phonetic spelling of the user name that is common in that region-of-origin. Communications support system 100 generates (at 808) audio that states the name with the particular pronunciation based on a text-to-speech conversion of the phonetic spelling or based on a recorded audio for the particular pronunciation of the name. Generating (at 808) the audio may include providing a tone, accent, pitch, and/or other voice characteristics of a digital speaker (e.g., male with British accent) to the audio.

Communications support system 100 records or plays (at 810) the audio as part of a customized message, greeting, chatbot conversation, or digital personal assistant audio. For example, communications support system 100 plays (at 810) the audio when the voicemail box associated with the device is reached, and the audio may speak the phrase "Please leave a message for NAME" in a consistent voice and with the correct pronunciation of the user name for the region-of-origin. As another example, the user may speak the digital personal assistant wake or launch phrase (e.g., "Hey X), and the digital personal assistant may respond with audio that states "Hi NAME, how may I help you" in a consistent voice and with the correct pronunciation of the user name for the region-of-origin.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

The invention claimed is:

1. A computer-implemented method for supported communications, the computer-implemented method comprising:

receiving a request to establish a communication session between a first device and a second device, wherein the request corresponds to one of an outbound call request, an inbound call request, or a request for a conference with audio or audio and video between the first device and the second device;

receiving an identifier associated with the first device from the request, wherein receiving the identifier associated with the first device comprises:

receiving a plurality of different identifiers associated with the first device;

prioritizing the plurality of different identifiers based on an accuracy with which each identifier from the plurality of different identifiers maps to a region-of-origin, wherein said prioritizing comprises providing a telephone number identifier priority over a network address identifier and the network address identifier priority over a geolocation identifier;

selecting the telephone number identifier as the identifier in response to the plurality of different identifiers comprising the telephone number identifier; and selecting the network address identifier as the identifier in response to the plurality of different identifiers omitting the telephone number identifier;

retrieving a word associated with the identifier;

mapping the identifier to a specific region-of-origin;

selecting a particular pronunciation of the word from a set of entries that correspond different pronunciations of the word to different regions-of-origin based on an automated matching of the specific region-of-origin to a particular entry of the set of entries with the particular pronunciation; and presenting, on the second device, the particular pronunciation of the word prior to enabling a real-time communication between the first device and the second device.

2. The computer-implemented method of claim 1, wherein presenting the particular pronunciation comprises:

modifying a user interface of the second device to display a phonetic spelling of the word that is different than a common spelling of the word.

3. The computer-implemented method of claim 1, wherein presenting the particular pronunciation comprises:

playing an audio sample with the particular pronunciation of the word on the second device.

4. The computer-implemented method of claim 1, further comprising:

extracting one or more of a country code and an area code from the identifier; and wherein mapping the identifier comprises:

selecting the specific region-of-origin based on the one or more of the country code and the area code.

5. The computer-implemented method of claim 1, further comprising:

selecting a first pronunciation of the word from the different pronunciations as the particular pronunciation in response to the specific region-of-origin corresponding to a first country or a first province; and selecting a second pronunciation of the word from the different pronunciations as the particular pronunciation in response to the specific region-of-origin correspond-
ing to a second country or a second province.

6. The computer-implemented method of claim 1, further
comprising:
    selecting, without input from a user associated with the
    second device, a first pronunciation of the word from
    the different pronunciations as the particular pronun-
    ciation in response to the specific region-of-origin
    corresponding to a region in which a first language is
    predominantly spoken and prior to presenting the par-
    ticular pronunciation or any of the different pronuncia-
    tions on the second device; and
    selecting, without input from a user associated with the
    second device, a second pronunciation of the word
    from the different pronunciations as the particular pro-
    nunciation in response to the specific region-of-origin
    corresponding to a region in which a second language
    is predominantly spoken and prior to presenting the
    particular pronunciation or any of the different pronun-
    ciations on the second device.

7. The computer-implemented method of claim 1, further
comprising:
    establishing the communication session between the first
    device and the second device after presenting the
    particular pronunciation on the second device.

8. The computer-implemented method of claim 1,
wherein retrieving the word comprises:
    querying a Customer Relationship Management (CRM)
    system using the identifier; and
    receiving the word in response to said querying.

9. The computer-implemented method of claim 1,
wherein retrieving the word comprises:
    determining a user account that is accessed based on login
    credentials provided with the identifier; and
    obtaining the word from the user account.

10. The computer-implemented method of claim 1, fur-
ther comprising:
    extracting, as the identifier, one or more of a network
    address, user agent, and autonomous system number
    from headers of one or more data packets associated
    with the request.

11. The computer-implemented method of claim 1,
wherein the word corresponds to a name of a user that is
associated with the first device.

12. A communications support system comprising:
    one or more hardware processors configured to:
        receive a request to establish a communication session
        between a first device and a second device, wherein
        the request corresponds to one of an outbound call
        request, an inbound call request, or a request for a
        conference with audio or audio and video between
        the first device and the second device;
        receive an identifier associated with the first device
        from the request, wherein receiving the identifier
        associated with the first device comprises:
            receiving a plurality of different identifiers associ-
            ated with the first device;
            prioritizing the plurality of different identifiers based
            on an accuracy with which each identifier from the
            plurality of different identifiers maps to a region-
            of-origin, wherein said prioritizing comprises pro-
            viding a telephone number identifier priority over
            a network address identifier and the network
            address identifier priority over a geolocation iden-
            tifier;

selecting the telephone number identifier as the iden-
            tifier in response to the plurality of different iden-
            tifiers comprising the telephone number identifier;
            and
            selecting the network address identifier as the iden-
            tifier in response to the plurality of different iden-
            tifiers omitting the telephone number identifier;
        retrieve a word associated with the identifier;
        map the identifier to a specific region-of-origin;
        select a particular pronunciation of the word from a set
        of entries that correspond different pronunciations of
        the word to different regions-of-origin based on an
        automated matching of the specific region-of-origin
        to a particular entry of the set of entries with the
        particular pronunciation; and
        present, on the second device, the particular pronun-
        ciation of the word prior to enabling a real-time
        communication between the first device and the
        second device.

13. The communications support system of claim 12,
further comprising:
    a database storing different sets of entries with each set of
    the different sets of entries corresponding different
    pronunciations of a different word to the different
    regions-of-origin.

14. The communications support system of claim 12,
wherein presenting the particular pronunciation comprises:
    playing an audio sample with the particular pronunciation
    of the word on the second device.

15. The communications support system of claim 12,
wherein the one or more hardware processors are further
configured to:
    extract one or more of a country code and an area code
    from the identifier; and
    wherein mapping the identifier comprises:
        selecting the specific region-of-origin based on the one
        or more of the country code and the area code.

16. A non-transitory computer-readable medium storing
program instructions that, when executed by one or more
hardware processors of a communications support system,
cause the communications support system to perform opera-
tions comprising:
    receiving a request to establish a communication session
    between a first device and a second device, wherein the
    request corresponds to one of an outbound call request,
    an inbound call request, or a request for a conference
    with audio or audio and video between the first device
    and the second device;
    receiving an identifier associated with the first device
    from the request, wherein receiving the identifier asso-
    ciated with the first device comprises:
        receiving a plurality of different identifiers associated
        with the first device;
        prioritizing the plurality of different identifiers based on
        an accuracy with which each identifier from the
        plurality of different identifiers maps to a region-of-
        origin, wherein said prioritizing comprises providing
        a telephone number identifier priority over a network
        address identifier and the network address identifier
        priority over a geolocation identifier;
        selecting the telephone number identifier as the iden-
        tifier in response to the plurality of different identi-
        fiers comprising the telephone number identifier; and
        selecting the network address identifier as the identifier
        in response to the plurality of different identifiers
        omitting the telephone number identifier;
    retrieving a word associated with the identifier;

mapping the identifier to a specific region-of-origin;

selecting a particular pronunciation of the word from a set of entries that correspond different pronunciations of the word to different regions-of-origin based on an automated matching of the specific region-of-origin to a particular entry of the set of entries with the particular pronunciation; and presenting, on the second device, the particular pronunciation of the word prior to enabling a real-time communication between the first device and the second device.

17. The computer-implemented method of claim 1, wherein receiving the identifier further comprises:

receiving a data packet that is sent from the first device as part of the request to establish the communication session; and determining an Autonomous System Number (ASN) that a first network router attaches to the data packet; and wherein mapping the identifier comprises:

determining the specific region-of-origin based on the ASN.

18. The computer-implemented method of claim 1, wherein mapping the identifier comprises:

querying one or more components of a core network, that is used to provide wireless telephony service to the first device, using the identifier; and mapping the identifier to a different second identifier that is not included in the request and that maps to specific region-of-origin.

19. The computer-implemented method of claim 18, wherein the identifier is a network address assigned to the first device and the different second identifier is a telephone number that is registered to the first device in the one or more components of the core network.

\* \* \* \* \*